United States Patent [19]

Wilson et al.

[11] 4,142,224
[45] Feb. 27, 1979

[54] CONTROL CENTER BUS BARS

[75] Inventors: John R. Wilson, Downers Grove; Brij M. Bharteey, Bolingbrook; Neal E. Rowe, Oak Forest, all of Ill.

[73] Assignee: Westinghouse Electric Corp., Pittsburgh, Pa.

[21] Appl. No.: 831,719

[22] Filed: Sep. 9, 1977

[51] Int. Cl.² .............................................. H02B 1/04
[52] U.S. Cl. ..................................... 361/356; 361/363; 361/334; 361/391; 174/133 B
[58] Field of Search ............... 361/334, 356, 358, 361, 361/357, 376, 378, 363, 390, 391; 174/68 B, 72 B, 99 B, 129 B, 133 B, 171

[56] References Cited

U.S. PATENT DOCUMENTS

| 2,802,910 | 8/1957 | Anjeskey | 174/68 B |
|---|---|---|---|
| 3,004,096 | 10/1961 | Rowe | 174/133 B |
| 3,288,911 | 11/1966 | Grimm | 174/68 B |
| 3,402,254 | 9/1968 | Parker | 174/133 B |
| 3,469,149 | 9/1969 | Paape | 361/334 |
| 3,550,269 | 12/1970 | Yatabe | 174/99 B |
| 4,025,866 | 5/1977 | Wilson | 361/334 |

Primary Examiner—Gerald P. Tolin
Attorney, Agent, or Firm—L. P. Johns

[57] ABSTRACT

A control center characterized by vertical bus bars having bent-over portions forming a U-shaped cross section adapted for engagement by clip-on contacts of a circuit interrupter.

1 Claim, 13 Drawing Figures

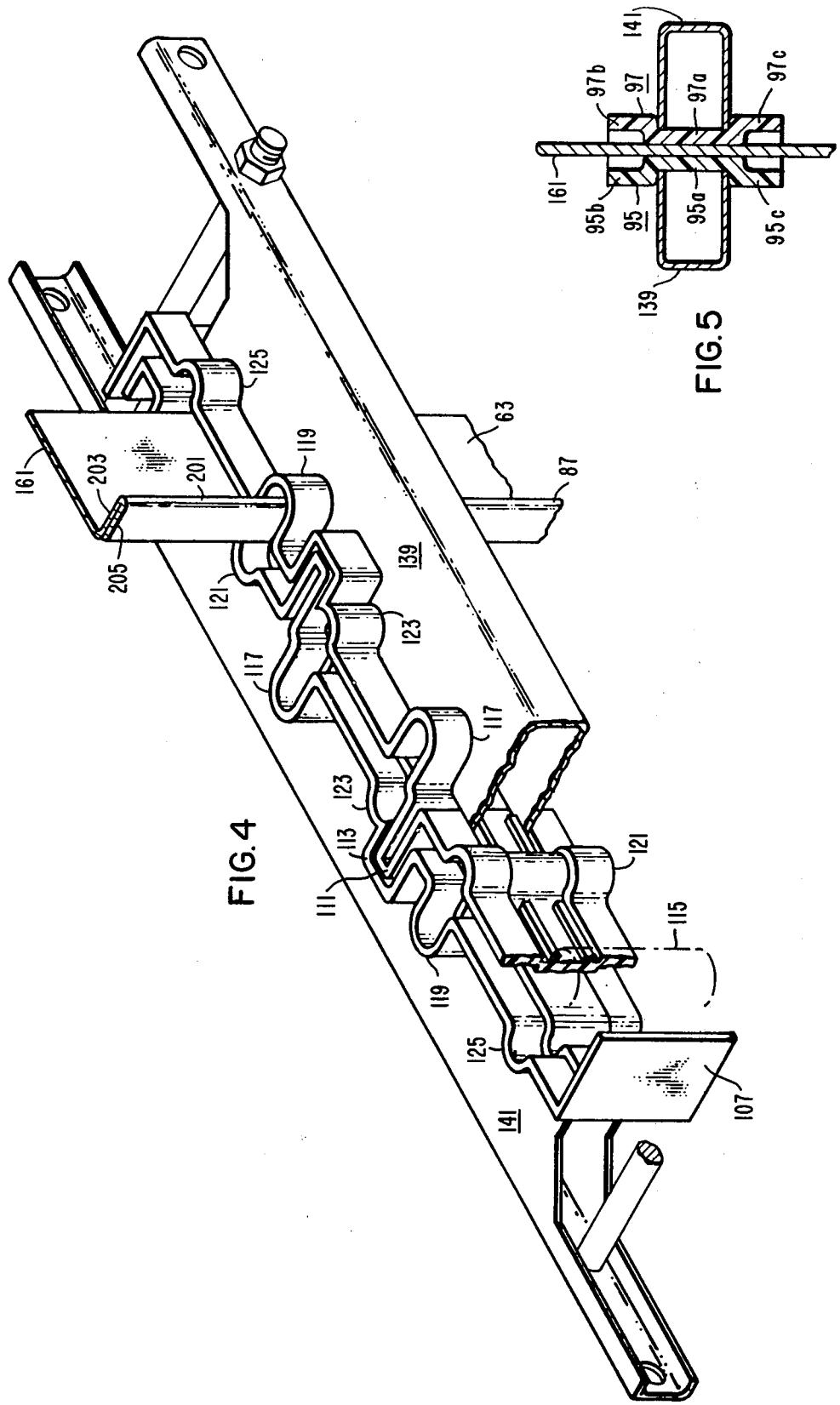

CONTROL CENTER BUS BARS

CROSS-REFERENCE TO RELATED APPLICATION

This application is related to the copending application of S. A. Shariff, B. M. Bharteey, and N. E. Rowe, Ser. No. 831,718 filed Sept. 9, 1977.

BACKGROUND OF THE INVENTION

1. Field of the Invention:

This invention relates to control centers and more particularly to bus bars formed from sheet metal.

2. Description of the Prior Art:

In a motor control center the distribution of power by the bus bar system is a vital factor that influences the whole designed concept. More specifically, the vertical bus bar distributes power down a vertical stack of motor controllers arranged one on top of the other. Due to the variety of current ratings, such as 300, 600, and 800 amperes, vertical bus bars of various thicknesses and shapes have been adopted. For example, bus bars having cross sections that are Z, L, flat, cross, and circular, are provided to meet customer requirements.

Associated with the foregoing has been a problem of economics. Aluminum and copper, being excellent electrical conductors, are substantially interchangeable as material for bus bars. Aluminum, however, is less desirable, due to instant formation of non-conducting aluminum oxide on surface of raw aluminum exposed to the atmosphere. It can be used for plug-in connectors (stabs) only after special preparation of surface, to prevent the formation of oxides. Accordingly, copper is the preferred material for bus bars by most customers of motor control centers. The copper flat bar is much more expensive than aluminum flat bar or extrusion while copper extrusions are still costlier. Thus, copper extrusions of prior use are too costly to be economically competitive for use as vertical bus bars. As an alternative, copper shapes comprising roll-formed sheet metal are economically feasible as bus bars. Heretofore, a formidable disadvantage of roll-formed copper sheet metal as a substitute for copper extruded bus bars has been a difficulty of roll-forming copper sheet metal. The metallurgical properties of copper have not been conducive to roll forming of cold copper sheet metal to form a flange or leg of a bus bar having the desired thickness to which a clip-on connector of a circuit breaker is clipped on.

SUMMARY OF THE INVENTION

It has been found in accordance with this invention that the problem with vertical bus bars of various sizes and shapes may be overcome by providing a control center for the distribution of electrical power from a power supply source to power consuming devices, comprising a cabinet having a plurality of vertical compartments on the front side of the cabinet, a plurality of vertical, horizontally spaced, bus bars in said cabinet, a circuit interrupter in the compartment and movable into and out of a position adjacent to the bus bars, each bus bar comprising a flange or leg in a plane aligned with the direction of movement of the circuit interrupter, said leg or flange having a bent-over configuration, and the bent-over portions of the flange or leg comprising a U-shaped member. In some cases, it includes a pair of spaced legs, at least one leg of which has an inturned part extending toward the other leg.

The advantage of the device of this invention is that it provides an economically feasible copper vertical bus bar arrangement comprising the features of plugging in at any point on a vertical plane of the bus bar from the front or rear thereof, bolted connections from front or rear, flexibility of changing current capacity, and inherently strong bus bars adapted to various short circuit levels for industry requirements.

BRIEF DESCRIPTION OF THE DRAWINGS

FIG. 4 is a perspective view of an assembly of the insulators with one L-shaped bus bar in place;

FIG. 5 is a fragmentary vertical sectional view, taken on the line V—V of FIG. 3.

DESCRIPTION OF THE PREFERRED EMBODIMENTS

Figure 1:
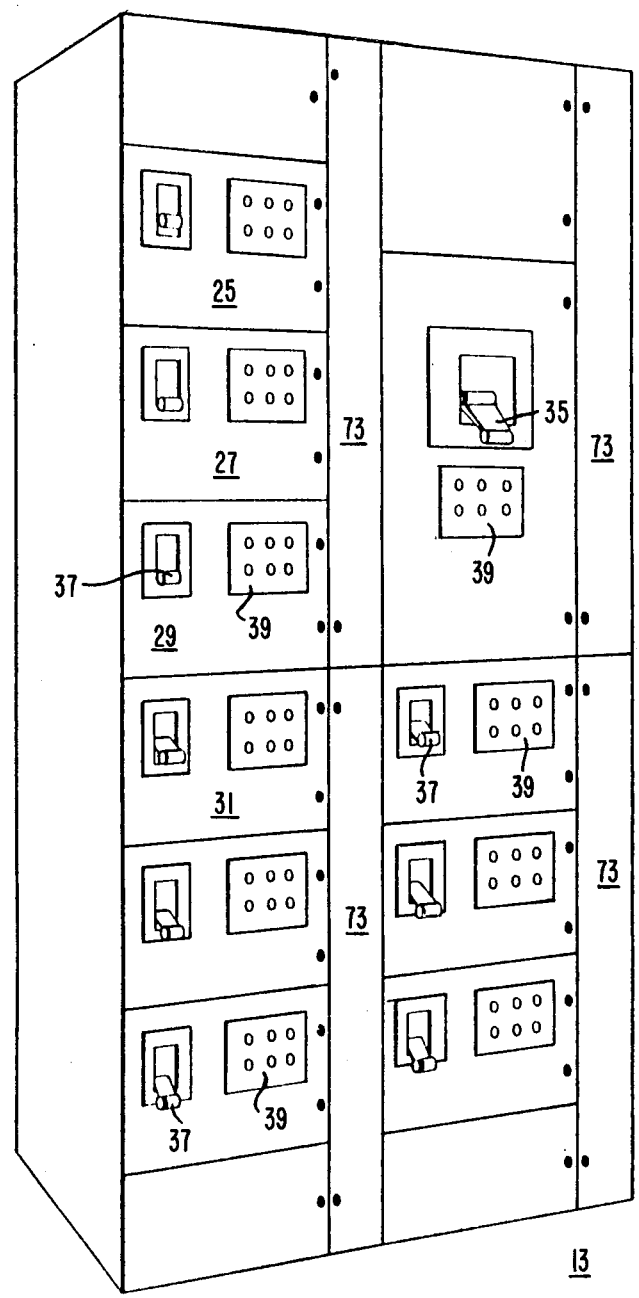
FIG. 1 is a perspective view of an electrical control center in accordance with this invention.
Figure 2:
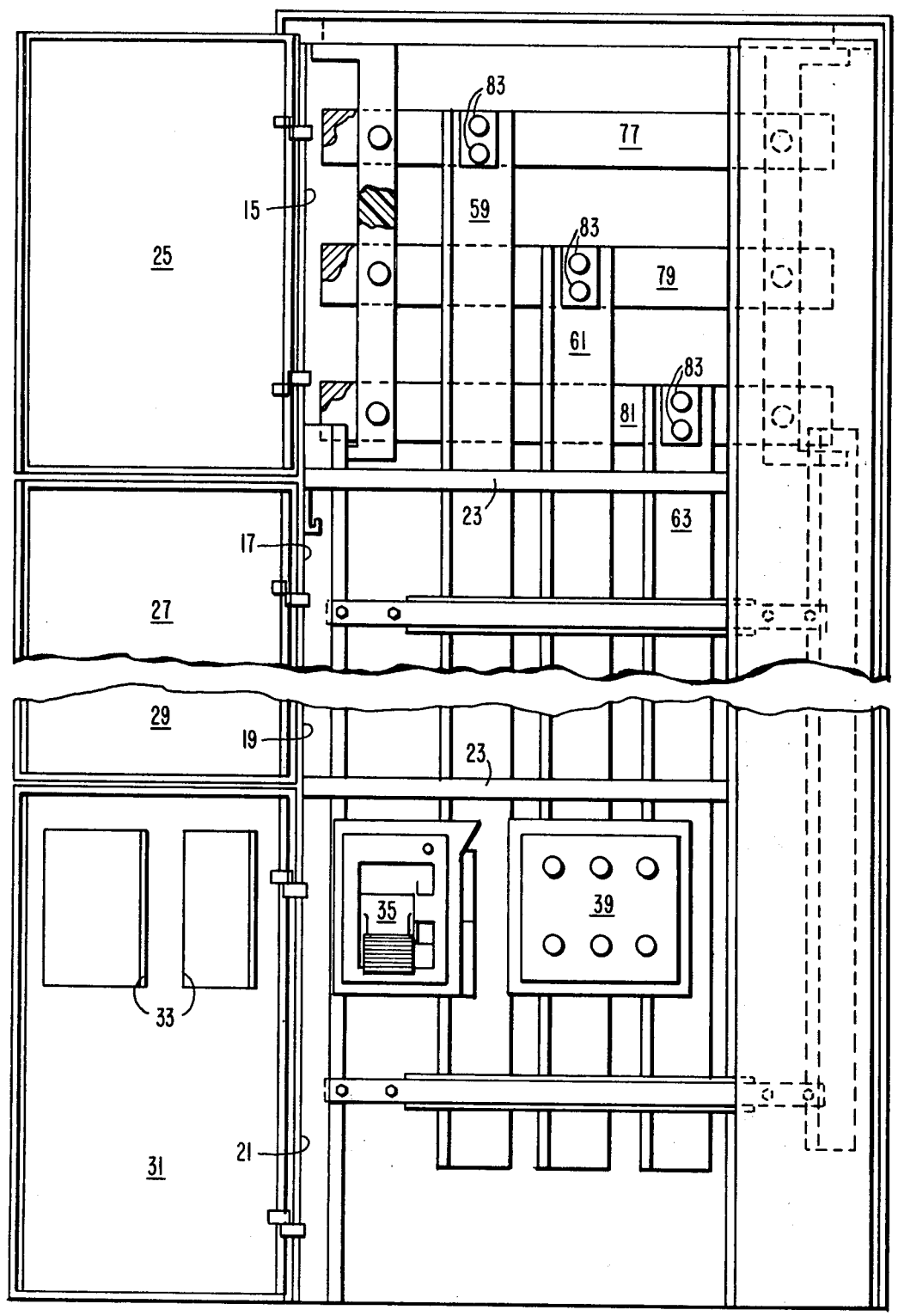
FIG. 2 is a front elevational view of the control center with the front doors open.

The electric control center of this invention is generally indicated at 13 in FIG. 1 and comprises a metal cabinet having a plurality of vertically disposed compartments such as compartments 15, 17, 19, and 21 which are separated by similar horizontal shelves 23, as shown in FIG. 2. Each compartment 15, 17, 19, 21 includes an access door 25, 27, 29, 31, respectively, which doors are provided with or without appropriate openings 33 to accommodate portions of circuit breakers, such as handles 35, or indicator light panel 39 as required.

Figure 3:
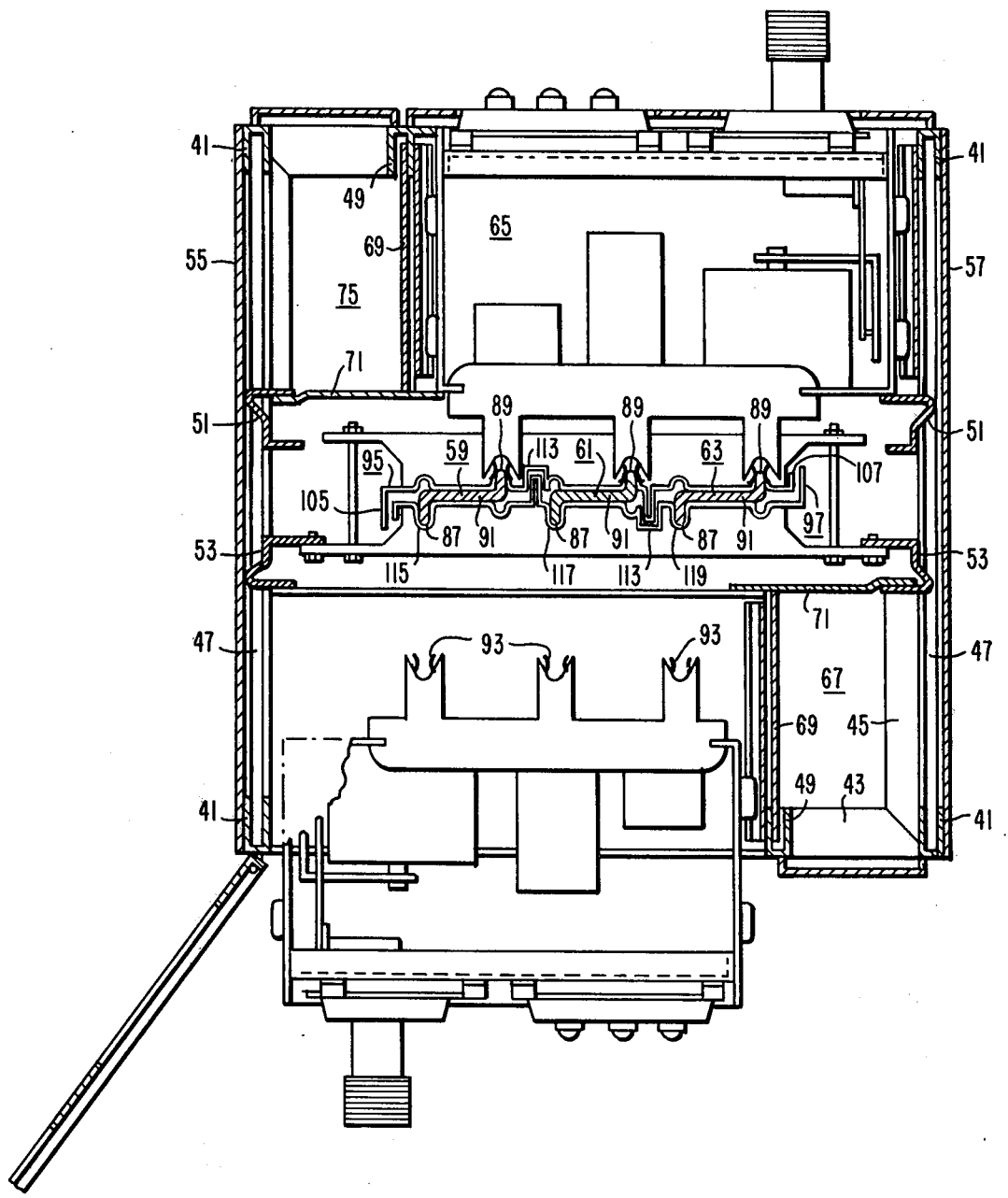
FIG. 3 is a horizontal sectional view taken on the line III—III of FIG. 2, and showing a circuit breaker being inserted in place.

The cabinet 13 includes a rectangular steel framework consisting of U-shaped corner posts 41 (FIG. 3), horizontal interconnectors 43, 45 at upper and lower ends and vertically spaced horizontal braces 47. In addition, the steel framework consists of upright posts 49, one at the front and rear sides of the cabinet 13. A pair of support posts 51 and 53 are also disposed at opposite sides of the cabinet 13 adjacent to opposite wall panels 55 and 57, as shown in FIG. 3.

In the embodiment of the invention disclosed herein, the front and rear sides of the cabinet 13 are provided with compartments similar to compartments 15–21 on the front side in which circuit interrupters 65 may be inserted from opposite sides of vertical bus bars 59, 61, 63 which are centrally disposed between the front and rear sides of the cabinet 13. The cabinet 13 is operative also where the rear side of the cabinet is not adapted for mounting of circuit interrupter 65. As shown in FIG. 3, the front side of the cabinet 13 comprises the stacked compartments 15, 17, 19, 21 on the left side of the upright post 49 and a vertically extending compartment 67 between the posts 49, 41. The compartment 67 is separated from the compartments 15–21 by a partition 69 and from the central area of the bus bars by a partition 71. Access to the compartment 67 is provided by a vertical door 73. The compartment 67 extends vertically between the upper and lower ends of the cabinet 13 and is provided for electric wires leading from the several circuit interrupters 65 disposed in the compartments 17, 19, 21. In embodiments of the invention having circuit interrupters 65 disposed at the rear wall, a vertical compartment 75 is likewise disposed for the same purpose as the compartment 67.

As shown more particularly in FIG. 2, the upper ends of the bus bars 59, 61, 63 are attached to separate horizontal buses 77, 79, 81, respectively, by suitable fastening means, such as similar pairs of bolts 83. The bus bars 59, 61, 63 extend vertically and substantially throughout the length of the vertical cabinet 13, whereby access to one or both sides thereof may be had by insertion of the several circuit interrupters 65 into appropriate compartments. As shown in FIG. 3, the bus bars 59, 61, 63 are preferably Z-shaped and consist of oppositely disposed flanges or legs 87, 89, and intermediate portions 91. The electrical capacity of the bus bars 59, 61, 63 may be increased by attaching metal bar members to the bus bars, such as in surface-to-surface contact with the intermediate portions of each bus bar. The flanges or legs 87 extend toward the front side 89 extends toward the rear side of the cabinet 13, while the intermediate portions 91 are preferably aligned and in a zone parallel to the front and rear sides of the cabinet. Accordingly, each circuit interrupter 65 is provided with similar terminal contact connectors or clips generally indicated at 93 which move into contact with corresponding flanges or legs 87. Although the copper bus bars 59, 61, 63 are preferably Z-shaped conductors, the bus bars may also be of other shapes, such as L, flat, and round, as shown in FIGS. 6-22. As shown in FIG. 2, each circuit interrupter 65 comprises a pair of mounting members 66 which extend from each opposite side wall and engage similar mounting tracks 68, which tracks may depend from the ajacent horizontal shelf 23, or may be separate from the shelves 23 and be mounted on adjacent frame members such as upright posts 41 and 49.

The bus bars 59, 61, 63 are mounted within a pair of insulators 95, 97. Plug-in type interrupters 65 are connected to the bus bars from the front and rear sides of the cabinet 13. As shown more particularly in FIG. 3, the insulator 95 is a substantially sheet-like member extending between a flange 105 on the left and a flange 107 on the right. To prevent sparkover or arcing from surface creepage between adjacent pairs of bus bars 59, 61, 63, the insulators include interfitting means between each pair of bus bars, which means comprise a flange 111 that projects transversely from the planar surface of one insulator 95 and 97 into a U-shaped member or flange-receiving groove 113 extending from the planar surface of the other of the insulators 95 and 97.

The insulators 95, 97 are identical in construction so that the interfitting flange and groove 111, 113, as well as the U-shaped ribs enclosing the flanges or legs 87, 89, provide a labyrinth passage between one side or flange 105 and the other side or flange 107 of the assembly. It is noted that the labyrinth assembly of the insulators and bus bars is maintained notwithstanding the thickness of the bus bars, thus ensuring required surface creepage distances.

Each insulator 95, 97 (FIGS. 3 and 4) has a plurality, preferably three, of vertically extending ribs 115, 117, 119 of U-shaped cross section into which the flanges or legs 87, 89 extend. A corresponding number of ribs 121, 123, 125, are also disposed in the insulators on opposite sides of the ribs 115, 117, 119 when the insulators are assembled. The ribs 121, 123, 125 likewise have U-shaped cross sections which are aligned with the ribs 115, 117, 119.

In FIG. 5, each insulator 95, 97 includes an intermediate portion 95a, 97a, respectively, which is clamped by the braces 139, 141 tightly against the bus bar 161. Upper and lower flanges 95b, 97b and 95c, 97c are disposed away from the bus bar 161 to provide additional creepage surfaces in the areas adjacent to the bus bar.

In accordance with this invention the bus bars 59, 61, 63 are fabricated from sheet metal of a suitable gauge or thickness to provide bent-over or U-shaped portions or flanges 201 having legs 203, 205 (FIG. 4), thereby providing an L-shaped bus bar 161. In a similar manner, a Z-shaped bus bar 163 (FIG. 7) may be provided as well as other bus bar configurations, such as shown in FIGS. 8-13 all of which are formed by roll-forming methods.

Figure 6:
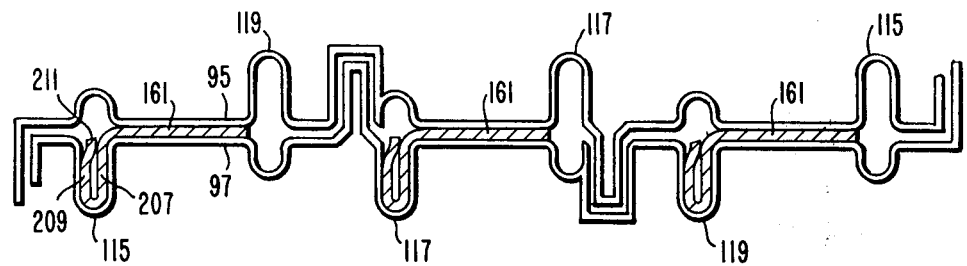
FIGS. 6–13 are horizontal sectional views showing various types of roll-formed bus bars which can be used with the same pair of insulators.
Figure 7:
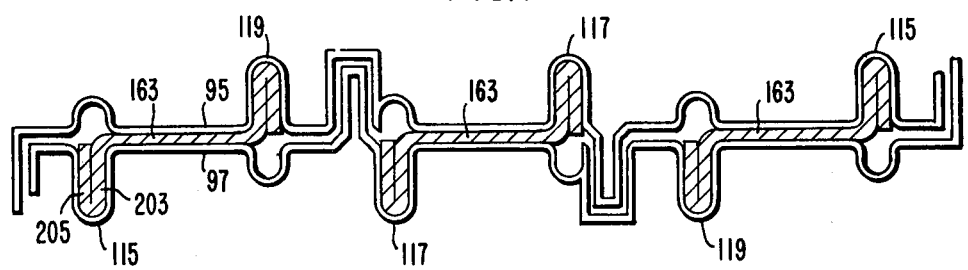
Figure 8:
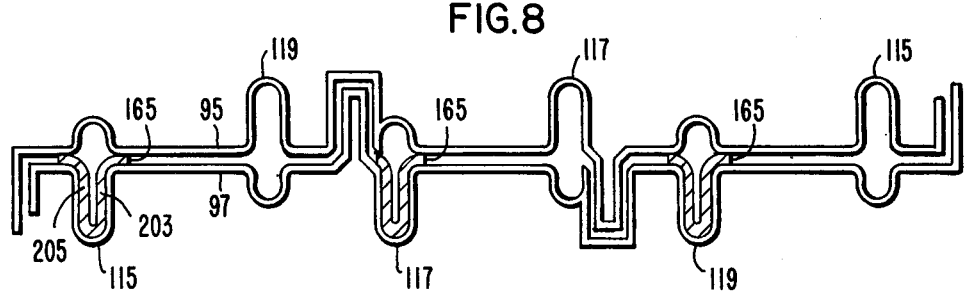

The flanges or legs of the several embodiments of the bus bars shown in FIGS. 6-13 have legs 203, 205 that are either in surface-to-surface contact as shown in FIGS. 4, 7, or the legs may be spaced apart as shown in other Figures of the drawings such as FIG. 8. Where connectors 93 of the several circuit breakers are relatively stiff and resistant to spreading when attached to the flanges or legs, it is preferable to reinforce the spaced-apart legs in a manner shown in FIG. 6 in order to avoid yielding of the legs toward each other into the space between them when a connector is attached. As shown in FIG. 6 the spaced-apart legs 207, 209 are reinforced by an inturned flange or edge 211 which extends from the leg 209 to the leg 207 in order to maintain the legs in the spaced-apart positions and thereby maintain good electrical contact with a pair of connectors.

The bent-over, roll-formed bus bars are preferably formed from sheet metal stock of a metal having a very high coefficient of electrical conductivity and having a gauge or thickness from about 0.187 to about 0.063 inch. Greater thicknesses of sheet metal stock may be used in accordance with current ratings so long as the resulting overall thickness of the flange or leg is satisfactory.

As shown in FIGS. 6-13, the insulators 95, 97, by being provided with the ribs 121, 123, 125 are usable with a plurality of roll-formed bus bars of many shapes and combinations. For example, bus bars of various configurations including L, Z, flat, cross, circular, are accommodated by the universally adapted insulators 95, 97. In FIG. 6 three L-shaped bus bars 161 are disposed between the insulators 95, 97. The bus bars 161 are rolled from sheet metal stock.

In FIG. 7 a Z-shaped bus bar 163 is disposed at three equally spaced positions, which bus bars are roll-formed from sheet metal stock.

In FIG. 8 three spaced bus bars 165, being roll-three equally spaced positions, which bus bars are roll-formed from sheet metal stock.

Figure 9:
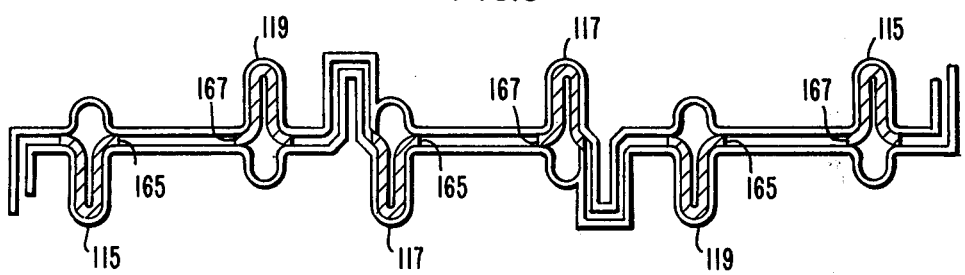

In FIG. 8 three spaced bus bars 165, being roll-formed from sheet metal stock, are disposed in the spaced ribs 115, 117, 119 of the insulator 97. In addition, as shown in FIG. 9 an additional set of three bus bars 167 are disposed in the ribs 115, 117, 119 of the insulator 95.

Figure 10:
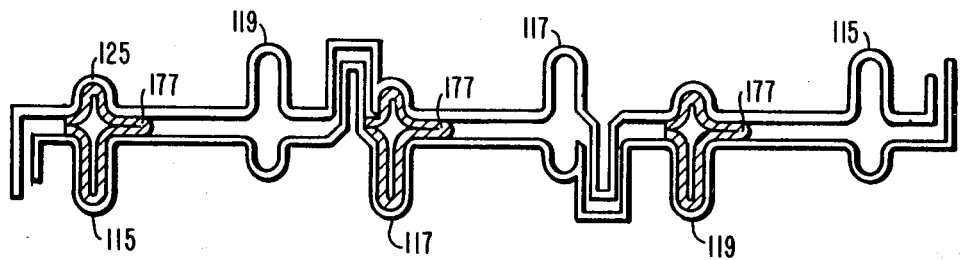
Figure 11:
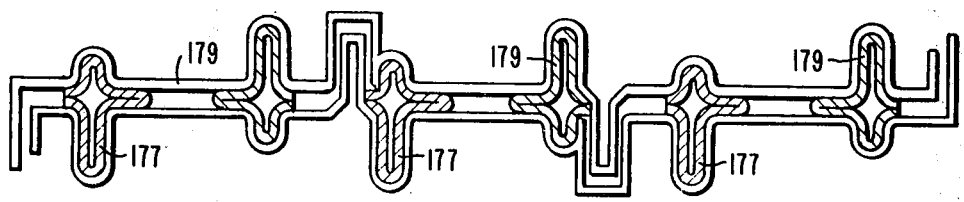

In FIGS. 10 and 11 three spaced bus bars 177 are separately disposed between the corresponding ribs, such as the ribs 115, 125, either separately or with an additional set of bus bars 179 (FIG. 14). Both sets of bus bars 177, 179 are roll-formed from sheet metal stock in a manner similar to the bus bars 173, 175.

Figure 12:
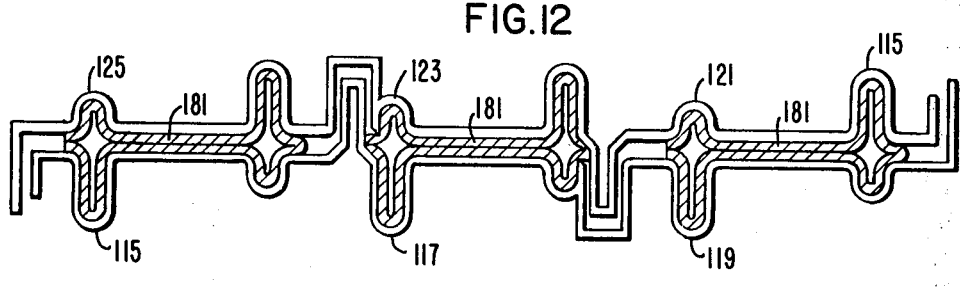
Figure 13:
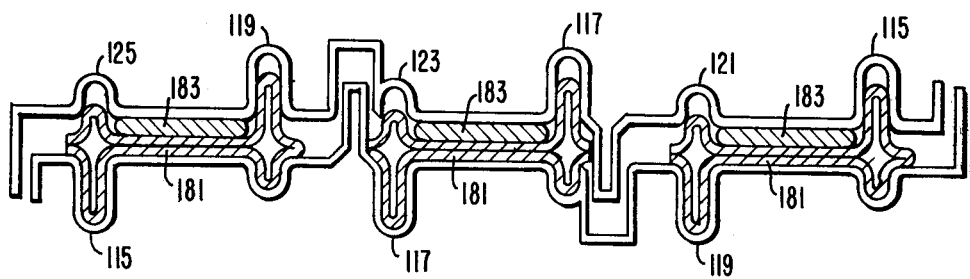

In FIGS. 12 and 13 three bus bars 181 are provided, either separately (FIG. 12), or together with an extra current carrying bar 183 (FIG. 13). As shown the bus bars 181 are roll-formed and disposed in and between adjacent pairs of ribs, such as the ribs 115, 125, and 119, 121.

Accordingly, the device of this invention provides bus bars of different configurations that are bent over or roll-formed to the desired shape.

What is claimed is:

1. A control center for distributing power from a power supply source to power consuming devices, comprising a cabinet having a plurality of vertically spaced compartments on the front side of the cabinet, a plurality of vertical, horizontally spaced, bus bars in said cabinet, a circuit interrupter in one compartment and movable into and out of a position adjacent to the bus bars, each bus bar comprising a portion in a plane aligned with the direction of movement of the circuit interrupter, said portion having a bent-over configuration, the bus bars being formed from sheet metal stock, the bent-over portion of the bus bar being U-shaped and comprising a pair of spaced legs and an intermediate U-bend part, each leg having a planar surface adjoining and extending from the U-bend part and being substantially parallel to the other leg, at least one leg having inturned edge extending toward the other leg, and the inturned edge being spaced from the U-bend part by the planar surface.

* * * * *